United States Patent [19]

Ferrari et al.

[11] Patent Number: 4,664,881

[45] Date of Patent: May 12, 1987

[54] ZIRCONIUM BASE FUEL CLADDING RESISTANT TO PCI CRACK PROPAGATION

[75] Inventors: Harry M. Ferrari, Edgewood, Pa.; Raymond F. Boyle, San Mateo, Calif.; Fred D. Kingsbury, Jr., Plum, Pa.

[73] Assignee: Westinghouse Electric Corp., Pittsburgh, Pa.

[21] Appl. No.: 589,300

[22] Filed: Mar. 14, 1984

[51] Int. Cl.[4] .............................................. G21C 3/00
[52] U.S. Cl. ..................................... 376/410; 376/416; 376/417; 427/6; 427/239; 427/405; 148/6.2; 148/6.35; 148/6
[58] Field of Search ............... 376/416, 414, 417, 410; 427/6, 239, 405; 106/1.16; 148/6.2, 6.35, 6

[56] References Cited

U.S. PATENT DOCUMENTS

| | | | |
|---|---|---|---|
| 4,029,545 | 6/1977 | Gordon | 376/417 |
| 4,200,492 | 4/1980 | Armijo | 376/417 |
| 4,284,660 | 8/1981 | Donaghy | 376/417 |
| 4,411,861 | 10/1983 | Steinberg | 376/417 |
| 4,473,410 | 9/1984 | Grubb | 376/417 |

*Primary Examiner*—Donald P. Walsh
*Attorney, Agent, or Firm*—John J. Prizzi

[57] ABSTRACT

The present invention pertains to zirconium base alloys containing about 0.1 to 0.6 weight percent tin; about 0.07 to 0.24 weight percent iron; about 0.05 to 0.15 weight percent chromium; and up to about 0.05 weight percent nickel. The balance of the alloy is zirconium with incidental impurities. The levels of the incidental impurity, oxygen, is controlled to a level of less than about 350 ppm. These alloys have been designed to minimize the adverse effects of pellet-clad interaction, when they are used as a liner bonded to the inside surface of water reactor nuclear fuel cladding. Specific cladding and fuel element designs according to the present invention are described.

22 Claims, 3 Drawing Figures

ZIRCONIUM BASE FUEL CLADDING RESISTANT TO PCI CRACK PROPAGATION

BACKGROUND OF THE INVENTION

The present invention pertains to the fields of zirconium base alloys and their use in water reactor fuel rod cladding. It is especially concerned with zirconium base alloys having properties which minimize the adverse effects of pellet-clad interaction (PCI) in water reactor fuel elements.

The use of cladding tubes made entirely of a high zirconium alloy has been the practice in the water reactor industry. Examples of common alloys used are Zircaloy-2, Zircaloy-4 and zirconium-2.5 w/o niobium. These alloys were selected based on their nuclear properties, mechanical properties, and high-temperature aqueous-corrosion resistance.

The history of the development of Zircaloy-2 and 4, and the abandonment of Zircaloy-1 and 3 is summarized in: Stanley Kass, "The Development of the Zircaloys," published in ASTM Special Technical Publication No. 368 (1964) pp. 3–27. This article is hereby incorporated by reference. Also of interest with respect to Zircaloy development are U.S. Pat. Nos. 2,772,964; 3,097,094; and 3,148,055.

Most commercial chemistry specifications for Zircaloy-2 and 4 conform essentially with the requirements published in ASTM B350-80, (for alloy UNS No. R60802 and R60804, respectively) for example. In addition to these requirements the oxygen content for these alloys is required to be between 900 to 1600 ppm but typically is about 1200±200 ppm.

It has been a common practice to manufacture Zircaloy cladding tubes by a fabrication process involving: hot working an ingot to an intermediate size billet, or log; beta solution treating the billet; machining a hollow billet; high temperature alpha extruding the hollow billet to a hollow cylindrical extrusion; and then reducing the extrusion to substantially final size cladding through a number of cold pilger reduction passes, having an alpha recrystallization anneal prior to each pass. The cold worked, substantially final size cladding is then final annealed. This final anneal may be a stress relief anneal, partial recrystallization anneal or full recrystallization anneal. The type of final anneal provided, is selected based on the designer's specification for the mechanical properties of the fuel cladding.

One problem that has occurred in the use of fuel rods utilizing the aforementioned cladding has been the observation of cracks emanating from the interior surface of the cladding which is placed under additional stress by contact with thermally expanding oxide fuel pellet fragments. These cracks sometimes propagate through the wall thickness of the cladding destroying the integrity of the fuel rod and thereby allowing coolant into the rod and radioactive fission products to contaminate primary coolant circulating through the reactor core. This cracking phenomena, is generally believed to be caused by the interaction of irradiation hardening, mechanical stress and fission products, producing an environment conducive to crack initiation and propagation in zirconium alloys.

Zircaloy fuel cladding tubes having a zirconium layer bonded to their inside surface have been proposed as being resistant to the propagation of cracks initiated at the interface between the fuel pellet and cladding during water reactor operation. Examples of these proposals are provided by U.S. Pat. Nos. 4,372,817; 4,200,492; and 4,390,497.

The zirconium liners of the foregoing patents have been selected because of their resistance to PCI crack propagation without consideration of their resistance to aqueous corrosion. If the cladding should breach in the reactor, allowing coolant inside the cladding, it is expected that the aqueous corrosion resistance of the liner will be vastly inferior to that of the high zirconium alloy making up the bulk of the cladding. Under these conditions the liner would be expected to completely oxidize thereby becoming useless, relatively rapidly, while leading to increased hydride formation in the zirconium alloy portion of the cladding, thereby comprising the structural integrity of the zirconium alloy. This degradation of the cladding could lead to gross failure with significantly higher release or uranium and radioactive species to the coolant.

The present inventors have proposed the following alloy barrier fuel cladding design which addresses this failing of the aforementioned designs.

It is submitted that the following zirconium base alloys will be particularly effective as a barrier to the propagation of PCI related cracks when they are metallurgically bonded in a thin fully recrystallized layer of at least about 0.003 mils in thickness to the inside surface of water reactor fuel cladding tubes composed of conventional zirconium base alloys. These PCI resistant alloys in accordance with the present invention contain:

1. About 0.1 to 0.6 weight percent tin;
2. About 0.07 to 0.24 weight percent iron;
3. About 0.05 to 0.15 weight percent chromium;
4. Up to about 0.05 weight percent nickel.
5. The balance of the alloy consists essentially of zirconium except for incidental impurities including oxygen which is limited to less than about 350 ppm.

Within the above composition range it is preferred that the tin content be held to about 0.2 to 0.6 wt. %, and most preferably about 0.3 to 0.5 wt. %.

It is also preferred that the total content of incidental impurities be limited to less than about 1500 ppm and more preferably less than 1000 ppm.

In addition, it is preferred that the oxygen and nitrogen contents be limited to less than about 250 ppm and about 40 ppm, respectively.

More particularly, the alloys shown in Table I are submitted to be particularly well suited for use as fuel element PCI barriers. These Table 1 alloys may, of course, be modified in accordance with aforementioned preferred teachings with respect to tin, oxygen, nitrogen and total incidental impurity content.

TABLE I

| Element | Broad Range (wt. percent) | Preferred Range I (wt. percent) | Preferred Range II (wt. percent) |
| --- | --- | --- | --- |
| Sn | 0.1–0.6 | 0.1–0.6 | 0.1–0.6 |
| Fe | 0.04–0.24 | 0.18–0.24 | 0.04–0.20 |
| Cr | 0.05–0.15 | 0.07–0.13 | 0.05–0.15 |
| Ni | ≦0.05 | <0.007 | 0.03–0.05 |
| Zr | Balance* | Balance* | Balance* |
| O | <350 ppm | <250 ppm | <250 ppm |
| N | <40 ppm | <40 ppm | <40 ppm |

*Zirconium constitutes the balance of these alloys with the exception of incidental impurities (including oxygen and nitrogen) which are kept below about 1500 ppm, total.

DETAILED DESCRIPTION OF THE INVENTION

Figure 1:
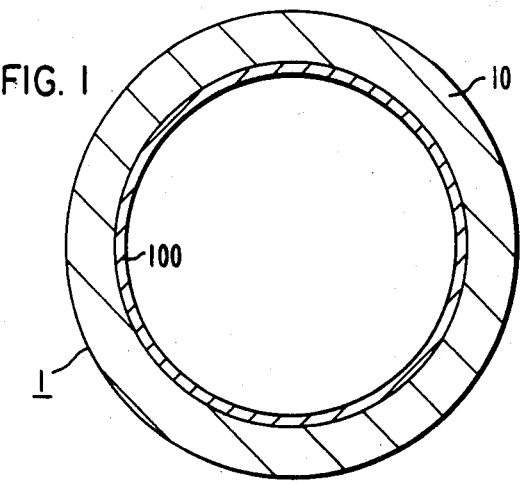
FIG. 1 shows a transverse cross section through a cladding tube according to the present invention.

A transverse section through a cladding tube 1 in accordance with the present invention is shown in FIG. 1. The cladding tube is composed of an outer layer, or tubular member, 10 bonded to an inner layer, or tubular member, 100. The outer layer 10 is composed of a first zirconium alloy having excellent resistance to in reactor aqueous corrosion, high strength, and a low creep rate. This first zirconium alloy is preferably a Zircaloy-2 alloy, a Zircaloy-4 alloy or a zirconium-niobium alloy such as zirconium-2.5 w/o niobium. The inner layer is composed of a second zirconium base alloy. This second alloy has been designed by the present inventors to have a combination of in pile resistance to crack propagation caused by pellet cladding interaction effects, as well as resistance to aqueous corrosion. Preferably the inner layer has a wall thickness between about 0.003 and 0.0045 inches. The composition ranges of this second alloy are shown in Table I, and have been selected based on the following theory.

The presence of tin in conjunction with iron and chromium, and the optional addition of nickel provides enhanced aqueous corrosion resistance to zirconium. However, tin and oxygen are solid solution strengtheners of zirconium. Iron, chromium and nickel provide some additional strengthening through the formation of Zr (Fe, Ni, Cr) precipitates. The foregoing elements also decrease the creep rate of zirconium and decrease the ability of zirconium to anneal out neutron irradiation defects at the ambient reactor operating temperature, thereby increasing irradiation hardening of the material. In summary then, while tin, iron, nickel and chromium tend to improve the aqueous corrosion properties of zirconium, they also should tend to be detrimental to zirconium's ability to stop the propagation of PCI related cracks.

The present inventors now submit that by limiting the tin content to 0.1 to 0.6 weight percent, and the oxygen content to less than about 350 ppm and more preferably less than 250 ppm, that the creep rate and stress relaxation rates of these alloys should be high enough to provide significantly enhanced and effective resistance to PCI crack propagation compared to the commercial zirconium alloy making up the outer portion of the cladding according to the present invention. It is further believed that when the tin content is held to about 0.2 to 0.6 weight percent in the present invention, an optimum combination of high creep rates, low neutron irradiation hardening, and aqueous corrosion resistance will be obtained. In the preferred range of about 0.2 to 0.6 wt. % tin, and more preferably 0.3 to 0.5, the creep rates of our alloy under BWR operating conditions should be comparable to that of zirconium containing less than 350 ppm oxygen, resulting in a barrier having the crack propagation resistance of zirconium, but with essentially the same aqueous corrosion resistance as commercial Zircaloy-2 or Zircaloy-4. In addition, the tin, iron, chromium and nickel contents of our alloy cause its recrystallized grain size to be significantly finer than that observed in zirconium.

It is further preferred that nitrogen, which can have an adverse effect on both aqueous corrosion resistance and PCI crack propagation resistance, be limited to less than 65 ppm and more preferably less than 40 ppm. It is preferred that all other incidental impurities listed in Table 1 of ASTM B350-80 meet the requirements shown there for alloy 60802 or 60804 which are as follows, maximum impurities, in wt.%:

| | |
|---|---|
| Al | 0.0075 |
| B | 0.00005 |
| Cd | 0.00005 |
| C | 0.0270 |
| Co | 0.0020 |
| Cu | 0.0050 |
| Hf | 0.010 |
| H | 0.0025 |
| Mg | 0.0020 |
| Mn | 0.0050 |
| Mo | 0.0050 |
| Ni (when not an alloying element) | 0.0070 |
| N | 0.0065 |
| Si | 0.0120 |
| Ti | 0.0050 |
| W | 0.010 |
| U | 0.00035 |

The total amount of incidental impurities (including oxygen and nitrogen) is preferably held to less than 1500 ppm and most preferably less than 1000 ppm to minimize the cumulative adverse effect incidental impurities can have on irradiation hardening. Table I of ASTM B350-80 is hereby incorporated by reference.

It should be understood that the cladding chemistry requirements set forth in this application may be met by performing chemical analyses at the ingot stage of manufacture for all alloying elements and impurities, and subsequently at an intermediate stage of manufacture, such as near the coextrusion stage, for the interstitial elements, oxygen, hydrogen and nitrogen. Chemical analysis of the final size cladding is not required.

The invention will be further clarified by the following examples which are intended to be purely exemplary of the present invention.

Two alloys having the nominal compositions shown in Table II are melted by arc melting the required alloying additions with commercially available zirconium.

TABLE II

| Nominal Ingot Composition of Inner Layer Material | | |
|---|---|---|
| | Alloy A | Alloy B |
| Sn | 0.5 w/o | 0.4 |
| Fe | 0.06 w/o | 0.18 |
| Cr | 0.06 w/o | .06 |
| Ni | 0.03 w/o | impurity |
| O | ~50-150 ppm | ~50-150 ppm |
| Zr | remainder, with incidental impurities totalling less than about 1500 ppm (including oxygen) | remainder, with incidental impurities totalling less than about 1500 ppm (including oxygen) |

The ingots formed are then fabricated by conventional Zircaloy primary fabrication techniques, including a beta solution treatment step, into tubular starting components for the inner layer. Tubular Zircaloy starting components for the outer layer are conventionally fabricated from ingots meeting the requirements of ASTM B350-80 for grade R60802 or R60804 and having an oxygen content between about 900 and 1600 ppm. These tubular starting components, for both the inner and outer layers, may have a cold worked, hot worked, alpha annealed, or beta quenched microstructure.

The inside diameter surface of the outer layer starting component, as well as the outside diameter surface of the inner layer starting component are then machined to size, such that the clearance between the components when nested inside of each other is minimized. After machining, the components are cleaned to remove, as nearly as possible, all surface contamination from the surfaces to be bonded. After cleaning, the component surfaces to be bonded are preferably maintained under clean room conditions until they are welded together. Recontamination of the surfaces to be bonded is thereby minimized. The components are then nested inside of each other, and the annulus formed at the interface of the adjacent components is vacuum electron beam welded shut, such that a vacuum is maintained in the annulus after welding both ends of the nested components.

At this stage, the unbonded tube shell assembly is ready to be processed according to the known extrusion, cold pilgering and annealing processes utilized to fabricate cladding tubes made completely of Zircaloy. Conventional Zircaloy lubricants, cleaning, straightening, and surface finishing techniques may be used in conjunction with any of the processes, both conventional and new, described in copending application Ser. Nos. 343,788 and 343,787 both filed on Jan. 29, 1982 (now continuation application Ser. Nos. 571,123 and 571,122, respectively, both filed on Jan. 13, 1984). which are hereby incorporated by reference. All of the foregoing fabrication processes will result in autogeneous, complete and continuous metallurgical bonding of the layers, except for minor, insignificant areas of unavoidable bond-line contamination.

Surface beta treatment, either by laser or induction heating, as described in U.S. patent application Ser. No. 343,788 while not required to practice the present invention is clearly preferred. When used, such treatment would be performed either between the next to last and last cold pilgering passes or just prior to the next to last cold pilger pass. In either case it is preferred that the tube have had an intermediate anneal as well as being straightened, if necessary, prior to surface beta treatment. After surface beta treatment all intermediate, as well as the final anneals, should be performed below 600° C. and more preferably below 550° C. Most preferably, the final anneal is performed at about 500° C. These low temperature anneals are used to preserve the enhanced corrosion resistance imparted by the beta surface treatment.

While the surface beta treatment produces a Widmanstätten microstructure in only about the outer 10 to 40% of the wall thickness of the beta surface treated intermediate size tube, it is to be understood that enhanced aqueous corrosion resistance produced by such treatment is not confined to that area but preferably extends throughout the outer layer, as well as the inner layer and is retained after cold pilgering and annealing. Most preferably the aqueous corrosion resistance of the outer layer and inner layer are characterized by a substantially black, adherent corrosion film and a weight gain of less than about 200 mg/dm$^2$ and more preferably less than about 100 mg/dm$^2$ after a 24 hour 500° C., 1500 psi steam test.

Whether or not surface beta treatment has been used, the final anneal, after the final cold pilgering pass, is one in which the zirconium alloy inner layer is at least substantially fully recrystallized, to a grain size which is no larger than about 1/10, and more preferably between about 1/10 and 1/20, the inner layer wall thickness and the Zircaloy outer layer has been at least fully stress relief annealed. After the final anneal, conventional Zircaloy tube cleaning, straightening, final sizing and finishing steps are performed.

Figure 3:
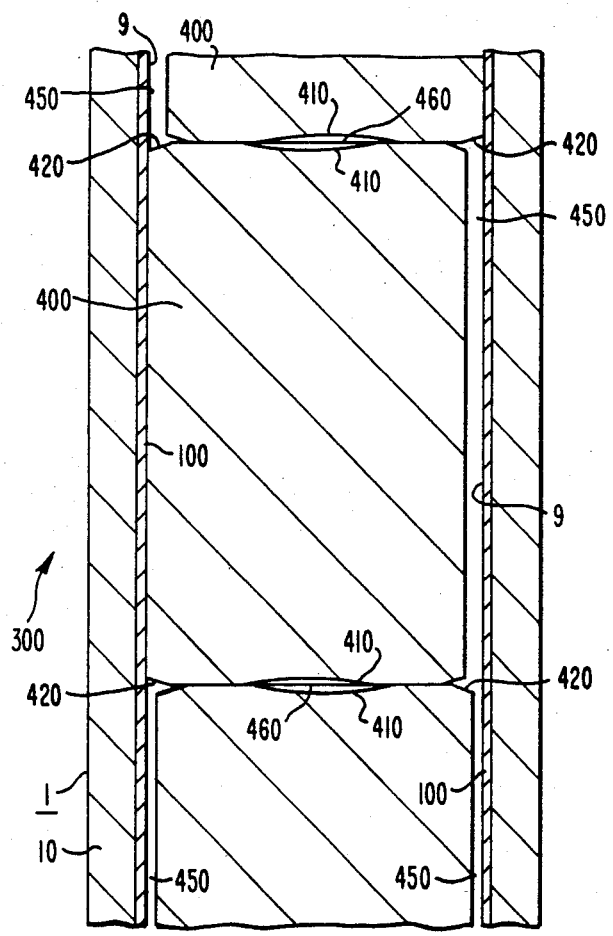
FIG. 3 shows an enlarged cross-sectional view of an enriched portion of the fuel element shown in FIG. 2 exposing a diametral longitudinal plane of the cladding.
Figure 2:
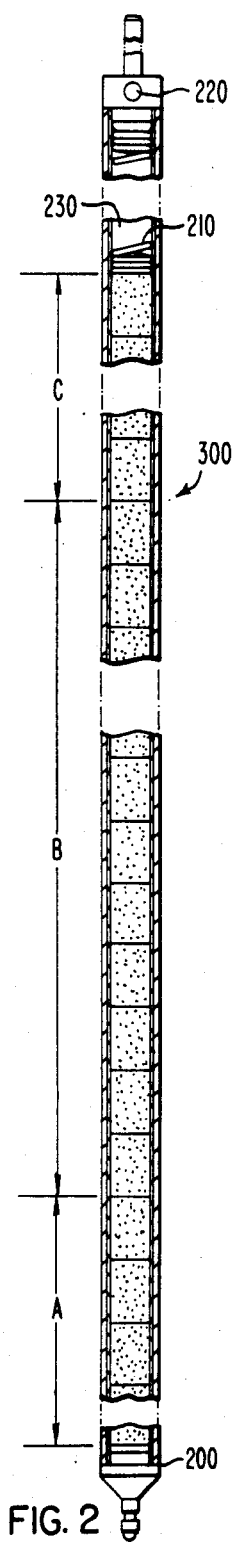
FIG. 2 shows a schematic presentation of a partial cross section through a water reactor fuel element in accordance with the present invention.

As finished, the lined cladding is ready for loading with fissile fuel material. A preferred embodiment of a hermetically sealed boiling water reactor fuel rod is shown in FIGS. 2 and 3. As shown in FIG. 3, the fuel rod 300 utilizes the cladding 1 according to the present invention. This cladding has an outer layer 10 preferably of Zircaloy 2 or 4 metallurgically bonded to an inner layer 100 about 0.003 inches thick and composed of, for example, either alloy A or B as previously described. The overall wall thickness of the cladding is preferably about 0.029 to 0.032 inches thick. Contained within the cladding 1 are generally cylindrical fuel pellets 400 having a diameter which is preferably about 0.008 inches smaller than the inside diameter of the cladding 1 in accordance with the present invention.

In a most preferred embodiment of the fuel rod 300 in accordance with the present invention, the fuel pellets 400 have been sintered to about 95% of their theoretical density and have an outside diameter of about 0.39 inches and a height of about 0.47 inches. As shown in FIG. 3 the ends 410 of each enriched pellet have been concavedly dished to minimize relative axial expansion of the hot center portion of the fuel pellet 400 in use. The edges 420 of each pellet 400 have been chamferred. The fuel pellets 400 preferably include enriched $UO_2$ pellets, enriched $UO_2+Gd_2O_3$ pellets, and natural $UO_2$ pellets. Mixed oxide, $UO_2+PUO_2$, pellets may also be used. The enriched pellets preferably contain uranium which has been enriched to include about 2.8 to 3.2 weight percent $U_{235}$. As shown in FIG. 2, the fuel pellets 400 are preferably stacked into three zones within the cladding tube 1. The bottom zone A is comprised of $UO_2$ pellets containing natural uranium. The bottom pellet in this zone abuts against the bottom Zircaloy end plug 200 which has been previously welded to the cladding tube 1. The middle portion B of the fuel pellet stack preferably makes up about at least 80% of the fuel pellet stack length and contains the aforementioned enriched uranium pellets. Enriched pellets containing about 3 to 5 weight percent gadolinium oxide ($Gd_2O_3$) may be substituted for all or part of the enriched pellets in this zone. The top zone C of the fuel pellet stack is comprised of $UO_2$ pellets containing natural uranium. In a preferred embodiment, the length of zone A and C are equal, and together comprise less than 20% of the fuel pellet stack length. The top pellet in the top zone C is in pressurized abutment with a spring which is compressively held between the top pellet and the top Zircaloy end cap 220 thereby forming a void space or plenum 230. Top end 220 is circumferentially welded to the cladding 1. The welded top 220 and bottom 200 end plugs in conjunction with the cladding 1 form a hermetically sealed container around the fuel pellets 400, and spring 210. The void space or plenum 230 is in communication with the clearance spaces 450 left between the pellets and the inside surface 9 of the cladding (see FIG. 3). The clearance spaces 450, 460 and void space 230 have been filled with a high purity, inert atmosphere having high thermal conductivity. Preferably, this atmosphere is high purity helium pressurized to about 2 to 5 atmospheres, and most preferably about 3 atmospheres (STP).

Other embodiments of the present invention will be apparent to those skilled in the art from a consideration of this specification or practice of the invention disclosed herein. It is intended that the specification and examples be considered as illustrative only, with the true scope and spirit of the invention being indicated by the following claims.

We claim:

1. A cladding tube for containing nuclear fuel material, wherein said cladding tube comprises:
   an outer tubular member;
   an inner tubular member;
   said inner tubular member located inside of said outer tubular member; the outer circumferential surface of said inner tubular member bonded to the inner circumferential surface of said outer tubular member over essentially the entire outer circumferential surface of said inner tubular member;
   said outer tubular member composed of a first alloy selected from the group of zirconium alloys consisting of Zircaloy-2 and Zircaloy-4 type alloys; and Zr-Nb alloys containing about 1.0 to 3.0 w/o Nb, said inner tubular member composed of a second alloy consisting essentially of:
   about 0.1 to 0.6 w/o tin;
   about 0.07 to 0.24 w/o iron;
   about 0.05 to 0.15 w/o chromium;
   up to about 0.05 w/o nickel;
   the balance of said second alloy consisting essentially of zirconium and incidental impurities;
   and wherein oxygen comprises less than about 350 ppm of said alloy;
   and said inner tubular member having a fully recrystallized grain structure and a wall thickness of at least about 0.003 inch.

2. The composite cladding tube according to claim 1 wherein the total amount of said incidental impurities is less than about 1000 ppm.

3. The composite cladding tube according to claim 1 wherein said second alloy contains:
   about 0.18 to 0.24 w/o iron;
   about 0.07 to 0.13 w/o chromium;
   and less than about 0.007 w/o nickel.

4. The composite cladding tube according to claim 1 wherein said second alloy contains:
   about 0.07 to 0.20 w/o iron;
   and about 0.03 to 0.05 w/o nickel.

5. The composite cladding tube according to claim 1 wherein said second alloy contains 0.2 to 0.6 w/o tin.

6. The composite cladding tube according to claim 3 wherein said second alloy contains 0.2 to 0.6 w/o tin.

7. The composite cladding tube according to claim 4 wherein said second alloy contains 0.2 to 0.6 w/o tin.

8. The composite cladding tube according to claim 6 wherein said first alloy is Zircaloy-4.

9. The composite cladding tube according to claim 7 wherein said first alloy is Zircaloy-2.

10. The composite cladding tube in accordance with claim 1 produced by a process comprising the steps of:
    obtaining an intermediate size composite cladding tube;
    then surface beta treating an outer layer of said outer tubular member;
    then cold working said intermediate size composite cladding tube in one step to substantially final size;
    and then annealing said composite cladding tube at a temperature below about 600° C. to produce a fine fully recrystallized grain size in said inner tubular member.

11. A water reactor nuclear fuel element comprising:
    an elongate composite cladding container;
    a nuclear fuel material sealed within said composite cladding container;
    said elongate composite cladding container having:
      an outer tubular member;
      an inner tubular member;
      said inner tubular member concentrically located between said nuclear fuel material and said outer tubular member; the outer circumferential surface of said inner tubular member bonded to the inner circumferential surface of said outer tubular member over essentially the entire outer circumferential surface of said inner tubular member;
      said outer tubular member composed of a first alloy selected from the group of zirconium alloys consisting of Zircaloy-2 and Zircaloy-4 type alloys, and Zr-Nb alloys containing about 1 to 3 w/o Nb;
      said inner tubular member composed of a second alloy consisting essentially of:
      about 0.1 to 0.6 w/o tin;
      about 0.07 to 0.24 w/o iron;
      about 0.05 to 0.15 w/o chromium;
      up to about 0.05 w/o nickel;
      the balance of said second alloy consisting essentially of zirconium and incidental impurities, and wherein the total amount of said incidental impurities is less than about 1500 ppm, of which oxygen comprises less than about 350 ppm;
      said inner tubular member having a recrystallized grain structure and a wall thickness of at least about 0.003 inch;
    substantially cylindrically shaped pellets comprising said nuclear fuel material;
    said pellets having an outside diameter smaller than the inside diameter of said inner tubular member forming a clearance space within said elongate composite cladding container;
    a pressurized inert gas filling said void space.

12. The fuel element according to claim 11 wherein said substantially cylindrically shaped pellets are stacked within said elongate composite cladding container forming a plenum space near one end of said elongate composite cladding container and wherein a spring means is located in said plenum exerting pressure on one end of said cylindrically shaped pellets;
    and said plenum also containing said pressurized inert gas.

13. The cladding tube according to claim 1 wherein said incidental impurities are limited to the following in weight percent:

| | |
|---|---|
| Al | ≦0.0075 |
| B | ≦0.00005 |
| Cd | ≦0.00005 |
| C | ≦0.027 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |
| U | ≦0.00035 |

14. The cladding tube according to claim 8 wherein said incidental impurities are limited to the following in weight percent:

| | |
|---|---|
| Al | ≦0.0075 |
| B | ≦0.00005 |
| Cd | ≦0.00005 |
| C | ≦0.027 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |
| U | ≦0.00035 |

15. The cladding tube according to claim 9 wherein said incidental impurities are limited to the following in weight percent:

| | |
|---|---|
| Al | ≦0.0075 |
| B | ≦0.00005 |
| Cd | ≦0.00005 |
| C | ≦0.027 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |
| U | ≦0.00035 |

16. The water reactor nuclear fuel element according to claim 11 wherein said first alloy is Zircaloy-2.

17. The water reactor nuclear fuel element according to claim 11 wherein said first alloy is Zircaloy-4.

18. The water reactor nuclear fuel element according to claim 11 wherein said incidental impurities are limited to the following:

| | |
|---|---|
| Al | ≦0.0075 |
| B | ≦0.00005 |
| Cd | ≦0.00005 |
| C | ≦0.027 |
| Co | ≦0.0020 |
| Cu | ≦0.0050 |
| Hf | ≦0.0100 |
| H | ≦0.0025 |
| Mg | ≦0.0020 |
| Mn | ≦0.0050 |
| Mo | ≦0.0050 |
| N | ≦0.0065 |
| Si | ≦0.0120 |
| Ti | ≦0.0050 |
| W | ≦0.010 |
| U | ≦0.00035 |

19. The cladding tube according to claim 1 wherein said second alloy contains 0.3 to 0.5 w/o tin.

20. The water reactor nuclear fuel element according to claim 11 wherein said second alloy contains 0.3 to 0.5 w/o tin.

21. The cladding tube according to claim 1 wherein said bond between the outer circumferential surface of said inner tubular member and the inner circumferential surface of said outer tubular member is an autogeneous bond.

22. The water reactor nuclear fuel element according to claim 11 wherein said bond between the outer circumferential surface of said inner tubular member and the inner circumferential surface of said outer tubular member is an autogeneous bond.

* * * * *